(12) United States Patent
Onosato et al.

(10) Patent No.: US 7,027,705 B2
(45) Date of Patent: Apr. 11, 2006

(54) OPTICAL FIBER FEED-THROUGH (75) Inventors: Yoichi Onosato, Tokyo (JP); Susumu Ichikawa, Tokyo (JP); Akio Watanabe, Tokyo (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 10/498,987

(22) PCT Filed: Feb. 19, 2003

(86) PCT No.: PCT/JP03/01766

§ 371 (c)(1),
(2), (4) Date: Jun. 25, 2004

(87) PCT Pub. No.: WO03/071322

PCT Pub. Date: Aug. 28, 2003

(65) Prior Publication Data
US 2005/0084227 A1 Apr. 21, 2005

(30) Foreign Application Priority Data
Feb. 22, 2002 (JP) .............................. 2002-045714
Jan. 22, 2003 (JP) .............................. 2003-013139

(51) Int. Cl.
G02B 6/36 (2006.01)
G02B 6/42 (2006.01)

(52) U.S. Cl. ..................... 385/135; 385/80; 385/92; 385/138

(58) Field of Classification Search ............ 385/76–80, 385/134, 136–139
See application file for complete search history.

(56) References Cited

U.S. PATENT DOCUMENTS 6,310,997 B1 * 10/2001 Kato et al. .................... 385/37

FOREIGN PATENT DOCUMENTS

| JP | 60-96607 | 7/1985 |
|---|---|---|
| JP | 8-15572 | 1/1996 |
| JP | 8-114723 | 5/1996 |
| JP | 8-304668 | 11/1996 |
| JP | 2000-180660 | 6/2000 |
| JP | 2000-338363 | 12/2000 |
| JP | 2001-91793 | 4/2001 |

* cited by examiner

Primary Examiner—John D. Lee
Assistant Examiner—Omar Rojas
(74) Attorney, Agent, or Firm—Armstrong, Kratz, Quintos, Hanson & Brooks, LLP (57) ABSTRACT An optical-fiber feedthrough formed of a metallic sleeve 1 and an optical fiber 2 fastened thereto. The the metallic sleeve 1 has i) a sleeve main body having a first hollow portion 9 which has an inner diameter larger than the outer diameter of the optical-fiber bare fiber uncovered portion 3 in the optical fiber 2 and into which the optical-fiber bare fiber uncovered portion is inserted, and a second hollow portion 8 which communicates with the first hollow portion and has an inner diameter larger than the outer diameter of the resin-covered portion 5 in the optical fiber and in which an inserted portion of the resin-covered portion and an optical-fiber bare fiber uncovered portion standing uncovered from the resin-covered portion to lead to the first hollow portion are held and ii) a first conical recessed portion 10 which is provided on the first hollow portion side of the sleeve main body and to which the leading end portion of the optical-fiber bare fiber uncovered portion is uncovered.

9 Claims, 7 Drawing Sheets

OPTICAL FIBER FEED-THROUGH

BACKGROUND OF THE INVENTION

1. Field of the Invention

This invention relates to an optical-fiber feedthrough that can make hermetic sealing for guiding an optical fiber into an optical communication module such as a semiconductor laser module or a semiconductor amplifier module, used in optical communication or the like. More particularly, it relates to an improvement of an optical-fiber feedthrough that can make an optical-fiber bare fiber not easily break when it is attached to a package sidewall of the optical communication module.

2. Description of the Related Art

In optical communication modules such as semiconductor laser modules, and semiconductor amplifier modules, a semiconductor element and an optical fiber are optically coupled inside the package. If the package is not hermetically sealed, any moisture having entered it from the outside may condense in the package to cause difficulties such that the optical element deteriorates and electrodes electrically short. Accordingly, what becomes important is the structure of hermetic sealing between the package and the optical fiber.

Hitherto, methods have been proposed in a large number and have been put into practical use. What is most common is a method in which a pipelike metallic sleeve is interposed between the package and the optical fiber to seal the package hermetically.

For example, Japanese Patent Application Laid-open No. H8-15572 discloses an optical-fiber feedthrough having a structure having i) an optical fiber constituted of a resin-covered portion at which the surface of an optical-fiber bare fiber is covered and an optical-fiber bare fiber uncovered portion standing uncovered from this resin-covered portion and ii) a pipe (metallic sleeve) with which this optical fiber is fastened, where the pipe and the optical-fiber bare fiber uncovered portion are soldered at the gap between them, and the gap between the pipe and the resin-covered portion are filled with an adhesive to bond them. Japanese Patent Application Laid-open No. H8-114723 also discloses an optical-fiber feedthrough having a structure having i) an optical fiber constituted of a first cover layer with which the surface of an optical-fiber bare fiber is covered, a second cover layer with which the first cover layer is covered and an optical-fiber bare fiber uncovered portion standing uncovered from the first cover layer and ii) an optical-fiber guide-in sleeve member (metallic sleeve) with which this optical fiber is fastened, where this optical-fiber guide-in sleeve member is constituted of a first columnar hollow portion into which an optical fiber with the second cover layer can be inserted, a second columnar hollow portion which communicates with the first one and into which an optical fiber with a first cover layer smaller in diameter than the first columnar hollow portion and a third columnar hollow portion which communicates with the second one and has a diameter larger than the second columnar hollow portion and in which the first cover layer and the optical-fiber bare fiber are held, where the air space between the optical fiber with the second cover layer and the first columnar hollow portion is filled with an adhesive to bond them, the air space between the first cover layer, the optical-fiber bare fiber and the third columnar hollow portion is filled with a solder, and a cover of an adhesive is provided at the leading end portion of the solder.

The metallic sleeve of this optical-fiber feedthrough is fastened to the package sidewall of the optical communication module by soldering or seam welding to effect hermetic sealing.

Now, in the optical-fiber feedthrough disclosed in Japanese Patent Application Laid-open No. H8-15572, the portion fastened with solder and the portion fastened with resin adjoin to each other inside the pipe (metallic sleeve). Hence, when the metallic sleeve of the optical-fiber feedthrough is soldered or seam-welded to the package sidewall of the optical communication module, the heat of the soldering or seam welding tends to be conducted to the resin-covered portion of the optical fiber and to the resin (adhesive) with which the optical fiber is fastened to the metallic sleeve, so that, at the worst, it has occurred that the stress to the optical fiber due to the deformation of the resin makes the optical-fiber bare fiber break.

In the optical-fiber feedthrough disclosed in Japanese Patent Application Laid-open No. H8-114723, too, the portion fastened with solder and the portion fastened with resin are adjacent to each other inside the optical-fiber guide-in sleeve member (metallic sleeve). Hence, like the optical-fiber feedthrough disclosed in Japanese Patent Application Laid-open No. H8-15572, there has been a problem that the optical-fiber bare fiber tends to break when the metallic sleeve of the optical-fiber feedthrough is soldered or seam-welded to the package sidewall of the optical communication module.

The present invention has been made taking note of such problems. Accordingly, an object of the present invention is to provide an optical-fiber feedthrough that can make the optical-fiber bare fiber not easily break when it is attached to the package sidewall of the optical communication module.

Another object of the present invention is to provide an optical-fiber feedthrough that enables sealing treatment by a simple method, making use of a solder having a higher melting point than any conventional one, and enables the optical communication module to be manufactured stably and to have highly reliable sealing structure.

Still another object of the present invention is to provide an optical-fiber feedthrough that can make the optical fiber not easily come out of the optical-fiber feedthrough when the optical fiber is pulled (i.e., has a high pull strength).

SUMMARY OF THE INVENTION

Accordingly, the present inventors have made extensive studies on the optical-fiber feedthrough in order to achieve the above objects. As a result, they have discovered an optical-fiber feedthrough structure that enables hermetic sealing with high reliability as the optical communication module when it is fastened to the package sidewall of the optical communication module by soldering or seam welding.

That is, the present invention is an optical-fiber feedthrough which has i) an optical fiber constituted of a resin-covered portion at which the surface of an optical-fiber bare fiber is covered and an optical-fiber bare fiber uncovered portion standing uncovered from the resin-covered portion and provided on the outer surface thereof with a metallic film and ii) a metallic sleeve with which the optical fiber is fastened, and which is to be attached to the package sidewall of an optical communication module so that the optical fiber is guided into the optical communication module, wherein, the metallic sleeve comprises:

a sleeve main body having a first hollow portion which has an inner diameter larger than the outer diameter of the optical-fiber bare fiber uncovered portion in the optical fiber and into which the optical-fiber bare fiber uncovered portion is inserted, and a second hollow-portion which communicates with this first hollow portion and has an inner diameter larger than the outer diameter of the resin-covered portion in the optical fiber and in which an inserted portion of the resin-covered portion and an optical-fiber bare fiber uncovered portion standing uncovered from the resin-covered portion to lead to the first hollow portion are held; and a first conical recessed portion which is provided on the first hollow portion side of the sleeve main body and to which the leading end portion of the optical-fiber bare fiber uncovered portion is uncovered;

the interior of the first conical recessed portion being filled with a solder to make the optical-fiber bare fiber uncovered portion fastened to the metallic sleeve and also make a gap between the first hollow portion and the optical-fiber bare fiber uncovered portion being closed with the solder, and a gap between the second hollow portion and the resin-covered portion being filled with an adhesive to make the resin-covered portion fastened to the metallic sleeve.

According to the optical-fiber feedthrough according to the present invention, a structure is provided in which the portion where the optical-fiber bare fiber uncovered portion in the optical fiber is fastened with a solder to the metallic sleeve and the portion where the resin-covered portion in the optical fiber is fastened with an adhesive to the metallic sleeve are separate, and hence the heat at the time the package is fastened can not easily be conducted to the resin-covered portion and adhesive in the optical fiber. Hence, when it is fastened to the package, the solder can be prevented from re-melt, the adhesive from thermal deterioration, and the resin-covered portion from thermal deterioration.

Thus, sealing treatment making use of a solder having a higher melting point than any conventional one may be carried out by a simple method, and the temperature and time in the sealing treatment may gently be managed. This brings the effect of enabling the optical communication module to be manufactured stably and to have highly reliable sealing structure.

Incidentally, an optical-fiber feedthrough improved in pull strength required when the optical fiber is pulled may also be made up by providing a cutout in the second hollow portion of the above sleeve main body and employing the following structure.

More specifically, presupposing the above optical-fiber feedthrough provided with a cutout, a structure may also be made up in which the leading end portion of the inserted portion of the optical fiber at its resin-covered portion is disposed at a position intermediate or substantially intermediate between the above cutout and the open end portion of the second hollow portion on its side opposite to the first hollow portion, and the second hollow portion is filled therein with the adhesive at least up to an end of the cutout on its first hollow portion side, and also a hollow is formed between an end of the second hollow portion on its first hollow portion side and an end of the adhesive on its first hollow portion side with which adhesive the second hollow portion is filled.

According to the optical-fiber feedthrough having such a structure, the leading end portion of the inserted portion of the optical fiber at its resin-covered portion is disposed at a position intermediate or substantially intermediate between the cutout and the open end portion of the second hollow portion on its side opposite to the first hollow portion and also the second hollow portion is filled therein with the adhesive at least up to an end of the cutout on its first hollow portion side, and hence the adhesive with which the second hollow portion is filled and the adhesive which fills out the interior of the cutout are kept in continuity to produce an anchor effect, and also part of the optical-fiber bare fiber uncovered portion held in the second hollow portion is fastened with the adhesive. Hence, the optical-fiber feedthrough has the effect of being improved in pull strength required when the optical fiber is pulled. Also, since the hollow is formed between an end of the second hollow portion on its first hollow portion side and an end of the adhesive on its first hollow portion side with which adhesive the second hollow portion is filled, the optical-fiber feedthrough has the effect of enabling sealing treatment making use of a solder having a higher melting point than any conventional one.

Then, a terminal component part may be set in the metallic sleeve on its first conical recessed portion side so that an optical-fiber feedthrough is made up to have a structure in which this terminal component part is held inside the package.

More specifically, presupposing the above optical-fiber feedthrough, an optical-fiber feedthrough may be made up in which a terminal component part to be held in the package of the optical communication module is set in the metallic sleeve on its first conical recessed portion side, where this terminal component part is constituted of i) a terminal component part main body having a third hollow portion which has an inner diameter larger than the outer diameter of the optical-fiber bare fiber uncovered portion and into which the optical-fiber bare fiber uncovered portion extending outward from the first conical recessed portion is inserted and ii) a second conical recessed portion which is provided in this terminal component part main body on its side opposite to the metallic sleeve and to which the leading end portion of the optical-fiber bare fiber uncovered portion is uncovered, and also the interior of this second conical recessed portion is filled with a solder to make the optical-fiber bare fiber uncovered portion fastened to the terminal component part and a gap between the third hollow portion and the optical-fiber bare fiber uncovered portion is closed with the solder.

In this case, a structure may be employed in which an auxiliary cylindrical portion is provided which extends outward from the peripheral edge portion of the second conical recessed portion in the above terminal component part main body, and also has a sixth hollow portion which communicates with the third hollow portion and has an inner diameter larger than this third hollow portion, to protect the leading end of the optical-fiber bare fiber uncovered portion standing uncovered from the second conical recessed portion.

As a modification, an optical-fiber feedthrough may also be made up in which the terminal component part to be held inside the package of the optical communication module is set in the metallic sleeve on its first conical recessed portion side, where this terminal component part is constituted of i) a terminal component part main body having a fourth hollow portion which has an inner diameter larger than the outer diameter of the optical-fiber bare fiber uncovered portion and into which the optical-fiber bare fiber uncovered portion is inserted and a fifth hollow portion which communicates with this fourth hollow portion and has an inner diameter larger than the fourth hollow portion and in which the optical-fiber bare fiber uncovered portion extending outward from the first conical recessed portion of the metallic sleeve is held and ii) a second conical recessed portion which is provided on this terminal component part main body on its side opposite to the metallic sleeve and to which the leading end portion of the optical-fiber bare fiber uncovered portion is uncovered, and also the interior of this second conical recessed portion is filled with a solder to make the optical-fiber bare fiber uncovered portion fastened to the terminal component part and a gap between the fourth hollow portion and the optical-fiber bare fiber uncovered portion is closed with the solder.

In this case, a structure may be employed in which an auxiliary cylindrical portion is provided which extends outward from the peripheral edge portion of the second conical recessed portion in the above terminal component part main body, and also has a sixth hollow portion which communicates with the fourth hollow portion and has an inner diameter larger than this fourth hollow portion, to protect the leading end of the optical-fiber bare fiber uncovered portion standing uncovered from the second conical recessed portion.

DETAILED DESCRIPTION OF EXEMPLARY EMBODIMENTS

To describe the present invention in greater detail, the present invention is described with reference to the accompanying drawings.

Figure 1:
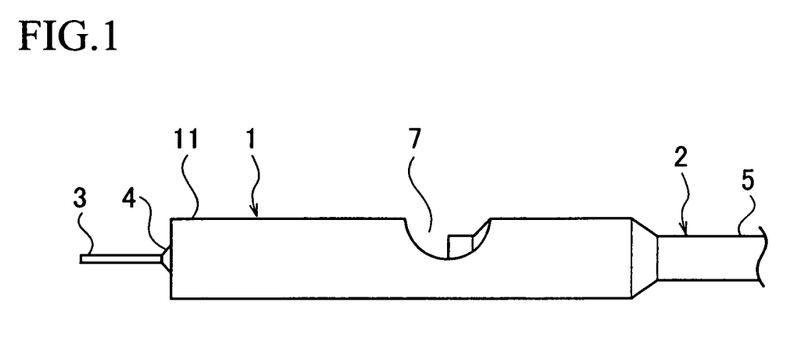
FIG. 1 is a schematic front elevation of an optical-fiber feedthrough according to a first embodiment of the present invention.
Figure 2:
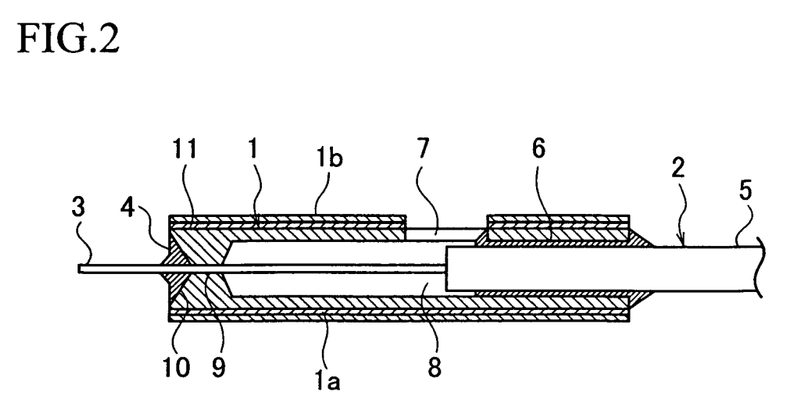
FIG. 2 is a vertical section of the one shown in FIG. 1, wherein reference numeral 1a denotes a subbing layer, and reference numeral 1b denotes a srface layer.

Incidentally, FIG. 1 presents a schematic front elevation of an optical-fiber feedthrough according to a first embodiment of the present invention. FIG. 2 presents a vertical section of the one shown in FIG. 1.

(First Embodiment)

First, as shown in FIGS. 1 and 2, the optical-fiber feedthrough according to this embodiment is constituted of a metallic sleeve 1 and an optical fiber 2 fastened to this metallic sleeve 1, and the optical fiber 2 is constituted of an optical-fiber bare fiber uncovered portion 3 and a resin-covered portion 5 with which the outer surface of the former is covered. On the outer surface of the optical-fiber bare fiber, a metallic film is provided which is constituted of a subbing layer formed of an Ni plating layer and a surface layer formed of an Au plating layer.

The metallic 1 sleeve is constituted of i) a sleeve main body having a first hollow portion 9 which has an inner diameter larger than the outer diameter of the optical-fiber bare fiber uncovered portion 3 in the optical fiber 2 and into which the optical-fiber bare fiber uncovered portion 3 is inserted, and a second hollow portion 8 which communicates with the first hollow portion 9 and has an inner diameter larger than the outer diameter of the resin-covered portion 5 in the optical fiber 2 and in which an inserted portion of the resin-covered portion 5 and an optical-fiber bare fiber uncovered portion 3 standing uncovered from the resin-covered portion 5 to lead to the first hollow portion 9 are held, and ii) a first conical recessed portion 10 which is provided on the first hollow portion side of the sleeve main body and to which the leading end portion of the optical-fiber bare fiber uncovered portion 3 is uncovered. Also, a cutout 7 having substantially the same radius as the second hollow portion 8 is holed at substantially the middle portion of the second hollow portion 8. Incidentally, in this embodiment, SUS304 is used in the metallic sleeve 1, and a subbing layer 1a formed of an Ni and/or Cr plating layer and a surface layer 1b formed of an Au plating layer are formed on the surface of the metallic sleeve.

Between the metallic sleeve 1 and the optical fiber 2, both are fastened in the following way. That is, the interior of the first conical recessed portion 10 in the metallic sleeve 1 is filled with solder (Au-120Sn eutectic solder) 4 to make the optical-fiber bare fiber uncovered portion 3 fastened to the metallic sleeve 1, and also a gap between the second hollow portion 8 and the resin-covered portion 5 is filled with an adhesive 6 to make the resin-covered portion 5 fastened to the metallic sleeve 1.

Incidentally, because the interior of the first conical recessed portion 10 is filled with the solder 4, the interior of the first conical recessed portion 10 is made full with the solder 4, and a gap between the first hollow portion 9 and the optical-fiber bare fiber uncovered portion 3 is also filled with part of the solder 4, so that the gap between these is closed with the solder 4.

To describe the above in greater detail, in the first conical recessed portion 10 the optical-fiber bare fiber uncovered portion 3 and the metallic sleeve 1 are fastened to each other by feeding the solder (Au/20Sn eutectic solder) into the first conical recessed portion 10, and thereafter heating the first conical recessed portion 10 from the outside of the metallic sleeve 1 to make the solder melt and also make it solidify. In this case, the heating temperature is controlled such that the temperature at the head of the heater comes to be 420° C. Also, the time of the heating effected in contact with the heater has been found favorable to be from 10 seconds to 15 seconds taking account of the melt time and flow time of the solder.

An He leak test was conducted on the part soldered in this way (i.e., the gap between the first hollow portion 9 and the optical-fiber bare fiber uncovered portion 3 in the metallic sleeve 1) to find that a leak was at a rate of $1\times10^{-9}$ Pa·m$^3$/s or less, where a high airtightness was maintained. Effects of heat on the resin-covered portion 5 of the optical fiber were also examined to find that any effects such as thermal deterioration and melting were not seen.

The leading end portion (package attachment part 11 which is a portion vicinal to the first conical recessed portion 10) of the optical-fiber feedthrough according to the First Embodiment, having such a structure, was fastened with solder (Sn/38Pb eutectic solder) to the package sidewall of the optical communication module. As a result, different from any conventional optical-fiber feedthrough, none of re-melt of the solder 4 at the first conical recessed portion 10, thermal deterioration of the adhesive 6 and thermal deterioration of the resin-covered portion 5 were seen, and also any break of the optical-fiber bare fiber did not occur.

That is, in the optical-fiber feedthrough according to this embodiment, the portion where the optical-fiber bare fiber uncovered portion 3 in the optical fiber 2 is fastened with the solder 4 to the metallic sleeve 1 and the portion where the resin-covered portion 5 in the optical fiber is fastened with an adhesive to the metallic sleeve 1 are separate, and hence the heat at the time the package is fastened cannot easily be conducted to the resin-covered portion 5 and adhesive 6 in the optical fiber. Also, a space is present inside the second hollow portion 8 of the metallic sleeve 1 at its portion extending from an end of the resin-covered portion 5 to the first hollow portion 9 and besides the cutout 7 communicating with the outside is provided at the second hollow portion 8, and hence a structure is provided that enables the heat inside the metallic sleeve 1 to be radiated outside with ease. Hence, when it is fastened to the package, the solder 4 can be prevented from re-melt, the adhesive 6 from thermal deterioration, and the resin-covered portion 5 from thermal deterioration.

Thus, this makes it possible to provide an optical-fiber feedthrough whose optical-fiber bare fiber cannot easily be broken when it is attached to the package sidewall of the optical communication module.

Figure 3:
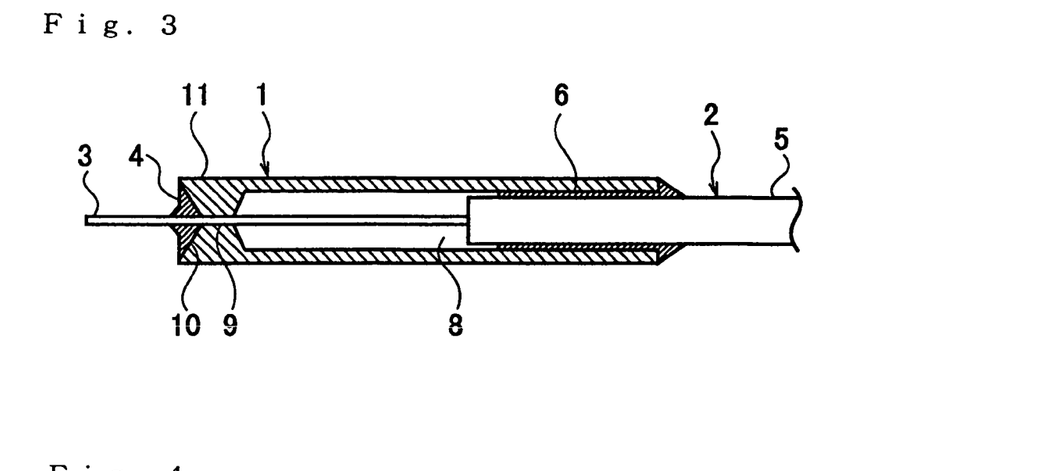
FIG. 3 is a sectional view of the construction of a modification of the optical-fiber feedthrough according to the first embodiment.

Incidentally, as to the cutout 7 provided at the second hollow portion 8, it may be omitted as shown in FIG. 3. Even if it is, it is possible to obtain the same effect as that the optical-fiber feedthrough shown in FIGS. 1 and 2 has.

Figure 4:
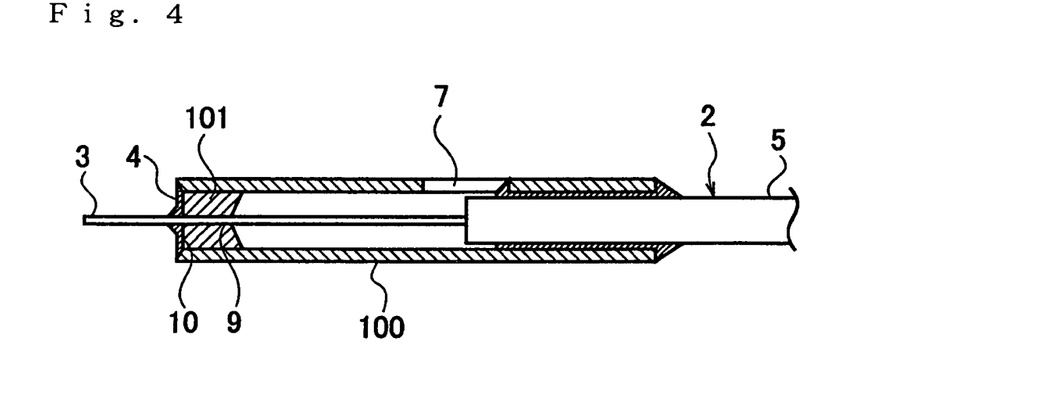
FIG. 4 is a sectional view of the construction of a modification of the optical-fiber feedthrough according to the first embodiment.
Figure 5:
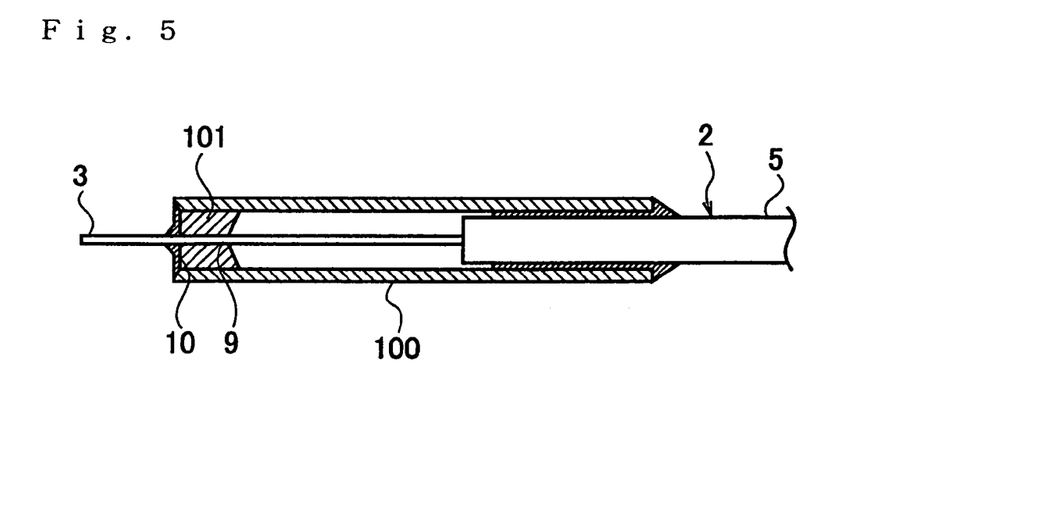
FIG. 5 is a sectional view of the construction of a modification of the optical-fiber feedthrough according to the first embodiment.

In the optical-fiber feedthrough shown in FIGS. 1 and 2, the metallic sleeve 1 is made up of a single constituent member. It, however, may have a structure in which, as shown in FIG. 4, it is constituted of a cylindrical main body 100 provided with the cutout 7, and a fitting member 101 which is fitted in this cylindrical main body 100 on its one open-end side and at the center of which the first hollow portion 9 is bored, and also which forms the first conical recessed portion 10 together with the open end portion of the cylindrical main body 100. Similarly, as to the optical-fiber feedthrough shown in FIG. 3, too, having no cutout 7, a method may be employed in which, as shown in FIG. 5, it is constituted of a cylindrical main body 100, and a fitting member 101 which is fitted in this cylindrical main body 100 on its one open-end side and at the center of which the first hollow portion 9 is bored, and also which forms the first conical recessed portion 10 together with the open end portion of the cylindrical main body 100.

(Second Embodiment)

Figure 6:
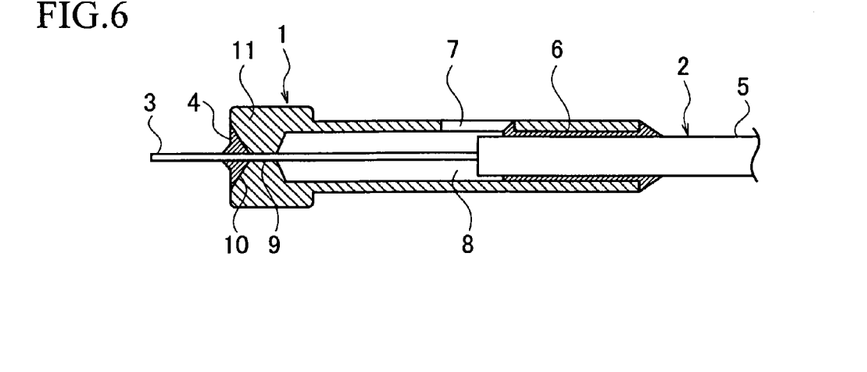
FIG. 6 is a sectional view of the construction of a metallic sleeve which constitutes part of an optical-fiber feedthrough according to a second embodiment of the present invention.

First, the optical-fiber feedthrough according to this embodiment has substantially the same structure as the optical-fiber feedthrough according to First Embodiment shown in FIGS. 1 and 2, except that as shown in FIG. 6 the outer diameter of the metallic sleeve 1 at a portion around the first hollow portion 9 is set larger than the outer diameter of the metallic sleeve 1 at its second hollow portion 8 and that a terminal component part is set in the metallic sleeve 1 on its first conical recessed portion 10 side, in order that a terminal component part to be held inside the package of the optical communication module is set in the metallic sleeve 1 on its first conical recessed portion 10 side.

Figure 7:
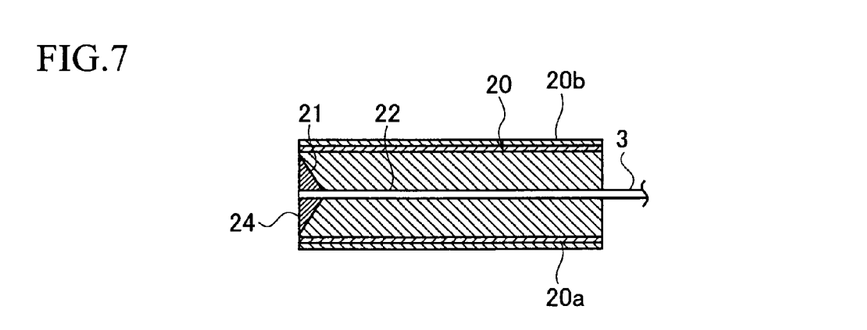
FIG. 7 is a sectional view of the construction of a terminal component part which constitutes part of the optical-fiber feedthrough according to the second embodiment of the present invention, wherein reference numeral 20a denotes a subbing layer, and reference numeral 20b denotes a surface layer.

The terminal component part 20 to be set in on the first conical recessed portion 10 side is, as shown in FIG. 7, constituted of i) a terminal component part main body having a third hollow portion 22 which has an inner diameter larger than the outer diameter of the optical-fiber bare fiber uncovered portion 3 and into which the optical-fiber bare fiber uncovered portion 3 extending outward from the first conical recessed portion 10 is inserted and ii) a second conical recessed portion 21 which is provided in this terminal component part main body on its side opposite to the metallic sleeve 1 and to which the leading end portion of the optical-fiber bare fiber uncovered portion 3 is uncovered.

Figure 8:
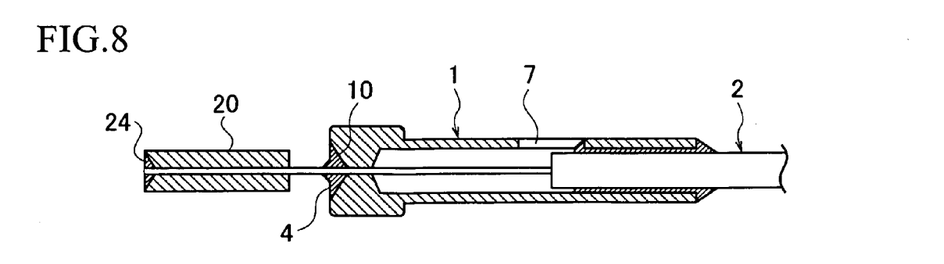
FIG. 8 is a sectional view of the construction of the optical-fiber feedthrough according to the second embodiment of the present invention.

The interior of the second conical recessed portion 21 is also filled with solder (Au/20Sn eutectic solder) 24 to make the optical-fiber bare fiber uncovered portion 3 fastened to the terminal component part 20 and a gap between the third hollow portion 22 and the optical-fiber bare fiber uncovered portion 3 is closed with the solder 24. As shown in FIG. 8, the terminal component part 20 is set in the metallic sleeve 1 on its first conical recessed portion 10 side. Incidentally, in soldering the terminal component part 20, it has been ascertained that good joining can be made, as a result of observation of the state of joining where the temperature of a heater section is changed to range from 380° C. to 470° C. and the heating time is changed to range from 10 seconds to 20 seconds.

Here, as the material of the terminal component part 20, SUS304 is used like the metallic sleeve 1, and a subbing layer 20a formed of an Ni and/or Cr plating layer and a surface layer 20b formed of an Au plating layer are formed on its surface. Incidentally, in this embodiment, whole-area Au plating is applied as the surface layer taking account of the fact that the optical-fiber feedthrough is fastened to the optical communication module by soldering. However, where a welder such as a YAG laser is used when fastened to the optical communication module, it is desirable to apply the Au plating only to the soldering part.

In the optical-fiber feedthrough according to this embodiment, when used, the leading end portion (package attachment part 11, the portion where the metallic sleeve 1 has a large diameter) of the metallic sleeve 1 is fastened with, e.g., solder (Sn/38Pb eutectic solder) to the package sidewall of the optical communication module, and the terminal component part 20 set in on the leading end side farther than the first conical recessed portion 10 is held in the package of the optical communication module.

In the optical-fiber feedthrough according to this embodiment, too, its leading end portion was fastened with solder (Sn/38Pb eutectic solder) to the package sidewall of the optical communication module, where, different from any conventional optical-fiber feedthrough, none of re-melt of the solder 4 at the first conical recessed portion 10, thermal deterioration of the adhesive 6 and thermal deterioration of the resin-covered portion 5 were seen, and also any break of the optical-fiber bare fiber did not occur.

Figure 9:
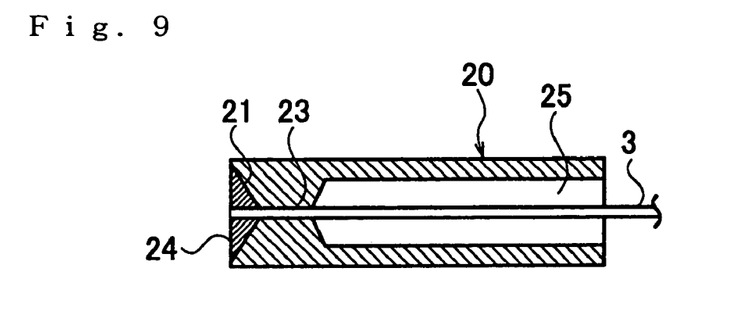
FIG. 9 is a sectional view of the construction of the terminal component part according to its modification.

Next, FIG. 9 is a sectional view of the construction of the terminal component part 20 according to its modification. More specifically, as shown in FIG. 9 the terminal component part 20 according to its modification is constituted of i) a terminal component part main body having a fourth hollow portion 23 which has an inner diameter larger than the outer diameter of the optical-fiber bare fiber uncovered portion 3 and into which the optical-fiber bare fiber uncovered portion 3 is inserted and a fifth hollow portion 25 which communicates with the fourth hollow portion 23 and has an inner diameter larger than the fourth hollow portion 23 and in which the optical-fiber bare fiber uncovered portion 3 extending outward from the first conical recessed portion 10 of the metallic sleeve 1 is held and ii) a second conical recessed portion 21 which is provided in this terminal component part main body on its side opposite to the metallic sleeve 1 and to which the leading end portion of the optical-fiber bare fiber uncovered portion 3 is uncovered.

Figure 10:
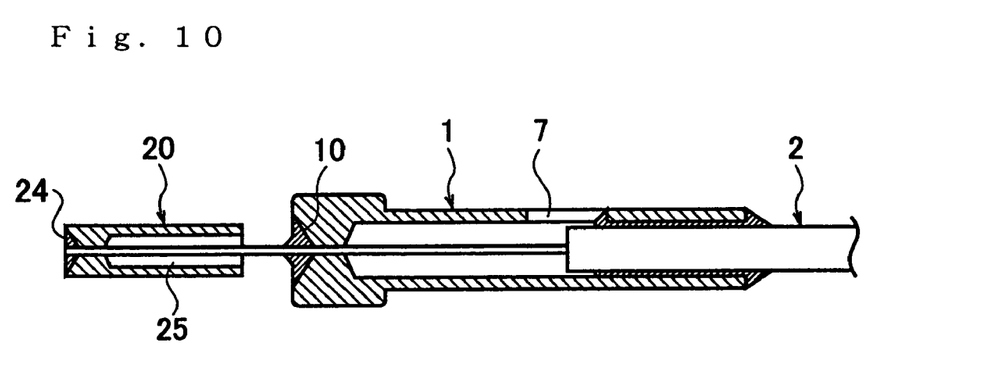
FIG. 10 is a sectional view of the construction of a modification of the optical-fiber feedthrough according to the second embodiment of the present invention.

The interior of the second conical recessed portion 21 is also filled with solder (Au/20Sn eutectic solder) 24 to make the optical-fiber bare fiber uncovered portion 3 fastened to the terminal component part 20 and a gap between the fourth hollow portion 23 and the optical-fiber bare fiber uncovered portion 3 is closed with the solder 24. As shown in FIG. 10, the terminal component part 20 is set in the metallic sleeve 1 on its first conical recessed portion 10 side.

Incidentally, in the optical-fiber feedthrough according to this embodiment, too, when used, the leading end portion (the portion where the metallic sleeve 1 has a large diameter) of the metallic sleeve 1 is fastened with, e.g., solder (Sn/38Pb eutectic solder) to the package sidewall of the optical communication module, and the terminal component part 20 set in on the leading end side farther than the first conical recessed portion 10 is held in the package of the optical communication module.

In the optical-fiber feedthrough according to this embodiment, too, its leading end portion was fastened with solder (Sn/38Pb eutectic solder) to the package sidewall of the optical communication module, where, different from any conventional optical-fiber feedthrough, none of re-melt of the solder 4 at the first conical recessed portion 10, thermal deterioration of the adhesive 6 and thermal deterioration of the resin-covered portion 5 were seen, and also any break of the optical-fiber bare fiber did not occur.

Figure 11:
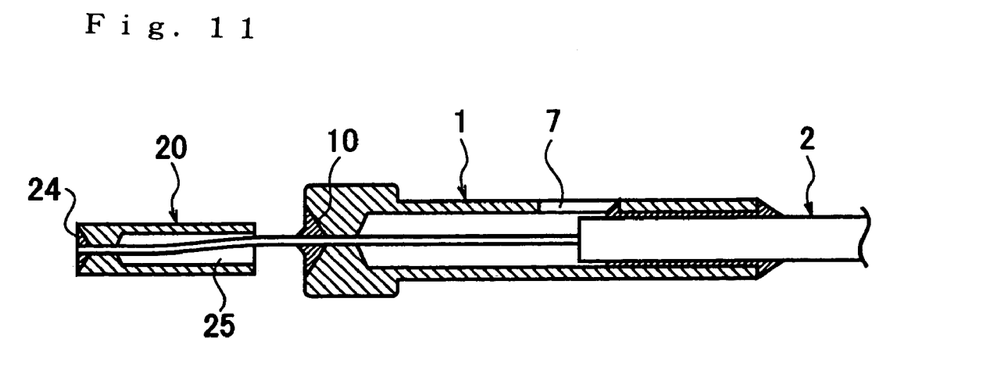
FIG. 11 is a sectional view of the construction of a modification of the optical-fiber feedthrough according to the second embodiment of the present invention.

In addition, in the optical-fiber feedthrough according to this embodiment, the fifth hollow portion 25 of the terminal component part 20 has a large inner diameter. Hence, even when as shown in FIG. 11 the terminal component part 20 was moved by 0.3 mm in parallel to its axis, a load was not easily applied to the optical-fiber bare fiber uncovered portion 3, and any troubles such as deformation, peel and break were not seen at every part.

(Third Embodiment)

Figure 12:
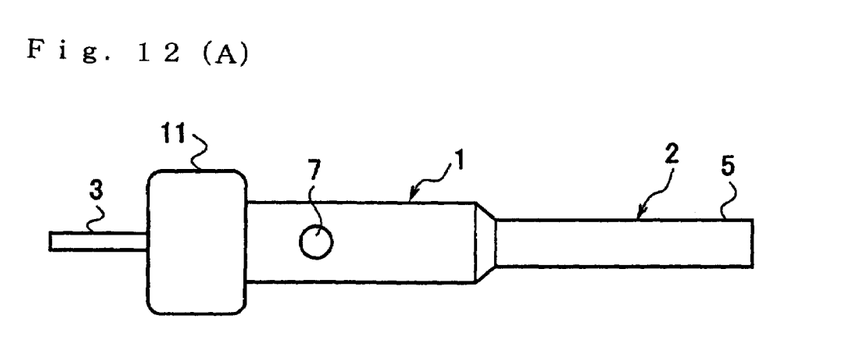
FIG. 12(A) is a schematic front elevation of a metallic sleeve which constitutes part of an optical-fiber feedthrough according to a third embodiment of the present invention.
FIG. 12(B) is a vertical section of the one shown in FIG. 12(A).

The optical-fiber feedthrough according to this embodiment is, as shown in FIGS. 12(A) and 12(B), substantially the same as the optical-fiber feedthrough according to the Second Embodiment except that the position of the cutout 7 formed at the second hollow portion 8 is set somewhat near to the first hollow portion 9 side compared with the FIG. 6 metallic sleeve 1 according to Second Embodiment, that the position of the leading end of the resin-covered portion 5 inserted into the second hollow portion 8 is set at a position substantially intermediate between the above cutout 7 and the open end portion of the second hollow portion 8 on its side opposite to the first hollow portion 9 and that the second hollow portion 8 is filled with the adhesive 6 up to an end of the cutout 7 on its first hollow portion 9 side. Incidentally, as shown in FIG. 12(B), a hollow 200 is formed between an end of the second hollow portion 8 on its first hollow portion 9 side and an end of the adhesive 6 on its first hollow portion 9 side with which adhesive the second hollow portion 8 is filled. Also, the cutout 7 has a circular shape of 0.5 mm in inner diameter.

In the optical-fiber feedthrough according to this embodiment, as shown in FIG. 12(B) the adhesive 6 with which the second hollow portion 8 is filled and the adhesive which fills out the interior of the cutout 7 are kept in continuity to produce an anchor effect, and also part of the optical-fiber bare fiber uncovered portion 3 held in the second hollow portion 8 is fastened with the adhesive 6. Hence, compared with the optical-fiber feedthrough according to Second Embodiment, the optical-fiber feedthrough has an advantage that its pull strength required when the optical fiber is pulled is greatly improved (i.e., the optical fiber cannot easily be pulled out compared with the optical-fiber feedthrough according to Second Embodiment).

In addition, the hollow 200 is formed between an end of the second hollow portion 8 on its first hollow portion 9 side and an end of the adhesive 6 on its first hollow portion 9 side with which adhesive the second hollow portion 8 is filled. Hence, where the leading end portion (package attachment part 11 which is a portion vicinal to the first conical recessed portion 10) of this optical-fiber feedthrough according to Third Embodiment was fastened with solder (Sn/38Pb eutectic solder) to the package sidewall of the optical communication module, different from any conventional optical-fiber feedthrough, none of re-melt of the solder 4 at the first conical recessed portion 10, thermal deterioration of the adhesive 6 and thermal deterioration of the resin-covered portion 5 were seen, and also any break of the optical-fiber bare fiber did not occur.

Incidentally, as to the cutout 7 formed at the second hollow portion 8, those in which its inner diameter was set to less than 0.2 mm and those in which its inner diameter was set to more than 0.9 mm were taken to make up similar optical-fiber feedthroughs experimentally, and their effect was confirmed. As a result, it has proved that, as to the former those of less than 0.2 mm in inner diameter, it is somewhat difficult in some cases to fill the interior with the adhesive 6 when it is attempted to do so up to the portion of the optical-fiber bare fiber uncovered portion 3 held in the second hollow portion 8, and that the above anchor effect also comes weak. On the other hand, as to those of more than 0.9 mm in inner diameter, it has proved that difficulties may arise such that the interior of the second hollow portion 8 is filled with the adhesive 6 in excess to make it difficult to form the hollow 200 and that the adhesive 6 having overflowed from the cutout 7 covers the outer surface of the metallic sleeve 1. Accordingly, in order to prevent such difficulties surely, the inner diameter of the cutout 7 formed at the second hollow portion 8 may preferably be set to from 0.2 mm or more to 0.9 mm or less.

(Fourth Embodiment)

Figure 13:
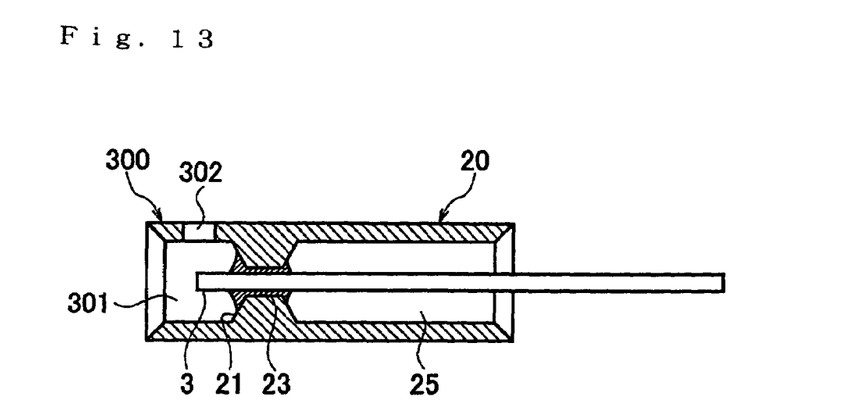
FIG. 13 is a sectional view of the construction of a terminal component part which constitutes part of an optical-fiber feedthrough according to a fourth embodiment of the present invention.

The optical-fiber feedthrough according to this embodiment is, as shown in FIG. 13, substantially the same as the optical-fiber feedthrough according to Second Embodiment except that, compared with the terminal component part 20 according to the modification of Second Embodiment as shown in FIG. 9, an auxiliary cylindrical portion 300 which extends outward from the peripheral edge portion of the second conical recessed portion 21 is provided at this portion in the terminal component part main body and that the leading end portion of the optical-fiber bare fiber uncovered portion 3 standing uncovered from the second conical recessed portion 21 has been subjected to end face treatment for optical coupling.

More specifically, as shown in FIG. 13, the auxiliary cylindrical portion 300 has a sixth hollow portion 301 which communicates with the fourth hollow portion 23 and has an inner diameter larger than this fourth hollow portion 23. Also, at this sixth hollow portion 301, a cutout 302 is holed which is to confirm therethrough the leading end portion of the optical-fiber bare fiber uncovered portion 3 held in the auxiliary cylindrical portion 300. The leading end portion of the optical-fiber bare fiber uncovered portion 3 standing uncovered from the second conical recessed portion 21 has also been subjected to end face treatment for optical coupling by which its end face is polished, or cut by cleaving, so as to be finished to have an optically favorable state.

In the optical-fiber feedthrough according to this embodiment, as shown in FIG. 13, the auxiliary cylindrical portion 300 is provided at the second conical recessed portion 21 of the terminal component part main body in the terminal component part 20. Hence, compared with the terminal component part 20 according to the modification of Second Embodiment as shown in FIG. 9, not having this auxiliary cylindrical portion, the present optical-fiber feedthrough has an advantage that the leading end portion of the optical-fiber bare fiber uncovered portion 3 standing uncovered from the second conical recessed portion 21 cannot easily be broken (see the terminal component part 20 according to a modification of Second Embodiment as shown in FIG. 14) when, e.g., the optical-fiber feedthrough is assembled.

Figure 14:
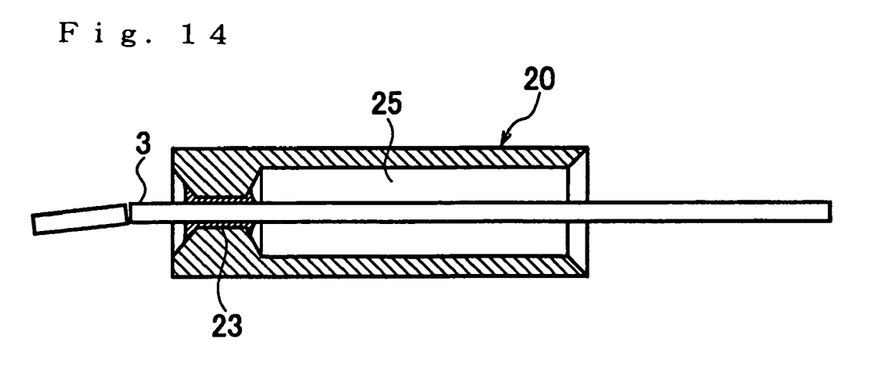
FIG. 14 is a sectional view of the construction of a terminal component part according to a modification of the second embodiment.
Figure 15:
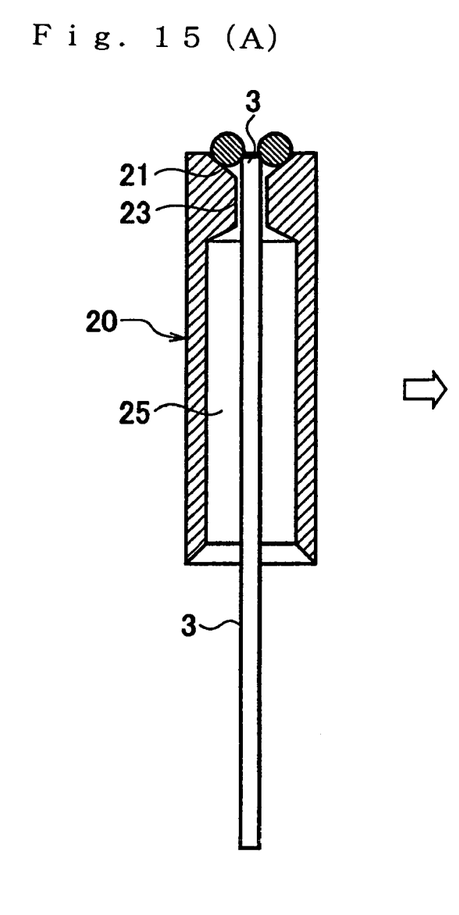
FIGS. 15(A) and 15(B) are illustrations showing the step of attachment to fasten the leading end of an optical-fiber bare fiber to the terminal component part by feeding solder balls to a second conical recessed portion in the terminal component part (a modification) according to the second embodiment.

In the terminal component part 20 according to the modification of Second Embodiment as shown in FIG. 14, a method is also employed in which a gap between the fourth hollow portion 23 and the optical-fiber bare fiber uncovered portion 3 inserted to the former is closed to fasten them, using Au/20Sn solder eutectic balls of about 0.3 mm in outer diameter. However, as shown in FIGS. 15(A) and 15(B), as to the solder eutectic balls to be held in the second conical recessed portion 21, the space for their holding is limited, and hence it is difficult to set their quantity large. If their quantity is set large, the molten solder may cover the leading end of the optical-fiber bare fiber uncovered portion 3.

Figure 16:
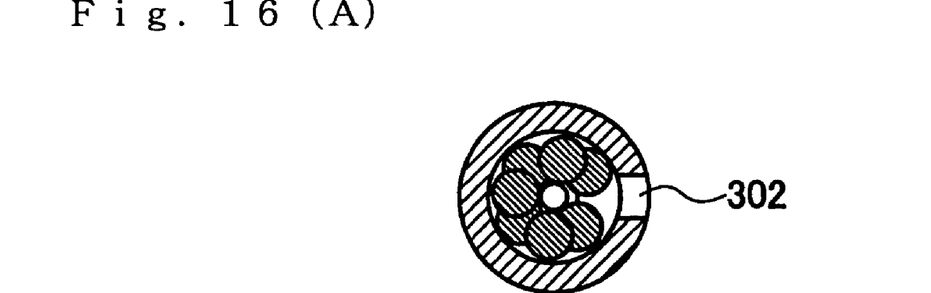
FIG. 16(A) is a schematic front elevation showing how solder balls are fed into an auxiliary cylindrical portion of a terminal component part according to a fourth embodiment.
FIG. 16(B) is its vertical section.

To cope with such a problem, in the optical-fiber feedthrough according to this embodiment, the auxiliary cylindrical portion 300 is provided at the second conical recessed portion 21 of the terminal component part 20. Hence, as to the solder eutectic balls to be held in the second conical recessed portion 21, their quantity can be set larger insofar as the space for their holding can be wider as shown in FIGS. 16(A) and 16(B).

Thus, the present optical-fiber feedthrough has an advantage that, insofar as the solder eutectic balls to be fed can be in a larger quantity, the strength can also be higher at which the optical-fiber bare fiber uncovered portion 3 inserted into the fourth hollow portion 23 is fastened at the gap between them. Also, at this sixth hollow portion 301, the cutout 302 is holed which is to confirm therethrough the leading end portion of the optical-fiber bare fiber uncovered portion 3 held in the auxiliary cylindrical portion 300. Hence, although the auxiliary cylindrical portion 300 is additionally provided, there can be no obstacle to the operation for making the solder eutectic balls held in the second conical recessed portion 21.

POSSIBILITY OF INDUSTRIAL APPLICATION

As described above, in the optical-fiber feedthrough according to the present invention, the structure is provided in which the portion where the optical-fiber bare fiber uncovered portion in the optical fiber is fastened with a solder to the metallic sleeve and the portion where the resin-covered portion in the optical fiber is fastened with an adhesive to the metallic sleeve are separate, and hence the heat at the time the package is fastened can not easily be conducted to the resin-covered portion and adhesive in the optical fiber. Hence, when it is fastened to the package, the solder can be prevented from re-melt, the adhesive from thermal deterioration, and the resin-covered portion from thermal deterioration.

Accordingly, sealing treatment making use of a solder having a higher melting point than any conventional one may be carried out by a simple method, and the temperature and time in the sealing treatment may gently be managed, and hence the present invention is suited for use as an optical-fiber feedthrough which provides stable manufacture and highly reliable optical communication module sealing structure.

The invention claimed is:

1. An optical-fiber feedthrough which has i) an optical fiber formed of a resin-covered portion at which the surface of an optical-fiber bare fiber is covered and an optical-fiber bare fiber uncovered portion standing uncovered from the resin-covered portion and provided on the outer surface thereof with a metallic film and ii) a metallic sleeve with which the optical fiber is fastened, and which is to be attached to the package sidewall of an optical communication module so that the optical fiber is guided into the optical communication module, wherein said metallic sleeve comprises:

a sleeve main body having a first hollow portion which has an inner diameter greater than an outer diameter of the optical-fiber bare fiber uncovered portion in the optical fiber and into which the optical-fiber bare fiber uncovered portion is inserted, and a second hollow portion which communicates with this first hollow portion and which has an inner diameter greater than an outer diameter of the resin-covered portion in the optical fiber and in which an inserted portion of the resin-covered portion and an optical-fiber bare fiber uncovered portion standing uncovered from the resin-covered portion to lead to the first hollow portion are held; and a first conical recessed portion which is provided on the first hollow portion side of the sleeve main body and to which the leading end portion of the optical-fiber bare fiber uncovered portion is uncovered, the interior of said first conical recessed portion being filled with a solder to fasten the optical-fiber bare fiber uncovered portion to the metallic sleeve and also to close a gap between the first hollow portion and the optical-fiber bare fiber uncovered portion with the solder, and a gap between the second hollow portion and the resin-covered portion being filled with an adhesive to make the resin-covered portion fastened to the metallic sleeve, wherein the cutout is provided at the second hollow portion of said metallic sleeve, and wherein the leading end portion of the inserted portion of the optical fiber at its resin-covered portion is disposed at a position intermediate or substantially intermediate between said cutout and the open end portion of said second hollow portion on its side opposite to the first hollow portion, and said second hollow portion is filled therein with the adhesive at least up to an end of the cutout on its first hollow portion side, and also a hollow is formed between an end of the second hollow portion on its first hollow portion side and an end of the adhesive on its first hollow portion side with which the second hollow portion is filled.

2. The optical-fiber feedthrough according to claim 1, wherein said cutout has a circular shape or substantially circular shape of from 0.2 mm or more to 0.9 mm or less in inner diameter.

3. The optical-fiber feedthrough according to claim 1 or 2, wherein said metallic sleeve is provided on the surface thereof with a subbing layer formed of an Ni and/or Cr plating layer and a surface layer formed of an Au plating layer.

4. An optical-fiber feedthrough which has i) an optical fiber formed of a resin-covered portion at which the surface of an optical-fiber bare fiber is covered and an optical-fiber bare fiber uncovered portion standing uncovered from the resin-covered portion and provided on the outer surface thereof with a metallic film and ii) a metallic sleeve with which the optical fiber is fastened, and which is to be attached to the package sidewall of an optical communication module so that the optical fiber is guided into the optical communication module, wherein said metallic sleeve comprises:

a sleeve main body having a first hollow portion which has an inner diameter greater than an outer diameter of the optical-fiber bare fiber uncovered portion in the optical fiber and into which the optical-fiber bare fiber uncovered portion is inserted, and a second hollow portion which communicates with said first hollow portion and which has an inner diameter greater than an outer diameter of the resin-covered portion in the optical fiber and in which an inserted portion of the resin-covered portion and an optical-fiber bare fiber uncovered portion standing uncovered from the resin-covered portion to lead to the first hollow portion are held; and a first conical recessed portion which is provided on the first hollow portion side of the sleeve main body and to which the leading end portion of the optical-fiber bare fiber uncovered portion is uncovered, wherein the interior of said first conical recessed portion is filled with a solder to fasten the optical-fiber bare fiber uncovered portion to the metallic sleeve and also to close a gap between the first hollow portion and the optical-fiber bare fiber uncovered portion with the solder, and a gap between the second hollow portion and the resin-covered portion being filled with an adhesive to make the resin-covered portion fastened to the metallic sleeve, and wherein a terminal component part to be held in the package of the optical communication module is set in said metallic sleeve on its first conical recessed portion side, where this terminal component part is formed of i) a terminal component part main body having a third hollow portion which has an inner diameter larger than the outer diameter of the optical-fiber bare fiber uncovered portion and into which the optical-fiber bare fiber uncovered portion extending outward from the first conical recessed portion is inserted and ii) a second conical recessed portion which is provided in this terminal component part main body on its side opposite the metallic sleeve and to which the leading end portion of the optical-fiber bare fiber uncovered portion is uncovered, and also the interior of said second conical recessed portion is filled with a solder to fasten the optical-fiber bare fiber uncovered portion to the terminal component part and to close a gap between the third hollow portion and the optical-fiber bare fiber uncovered portion with the solder.

5. The optical-fiber feedthrough according to claim 4, wherein an auxiliary cylindrical portion is provided which extends outward from the peripheral edge portion of the second conical recessed portion in said terminal component part main body, said terminal component part main body having a fourth hollow portion which has an inner diameter greater than the outer diameter of the optical-fiber bare fiber uncovered portion and into which the optical-fiber bare fiber uncovered portion is inserted and a fifth hollow portion which communicates with said fourth hollow portion and which has an inner diameter greater than the fourth hollow portion and in which the optical-fiber bare fiber uncovered portion extending outward from the first conical recessed portion of the metallic sleeve is held and also has a sixth hollow portion which communicates with said third hollow portion and which has an inner diameter greater than said third hollow portion, to protect the leading end of the optical-fiber bare fiber uncovered portion standing uncovered from the second conical recessed portion, and wherein the leading end portion of said optical-fiber bare fiber uncovered portion has been subjected to end face treatment for optical coupling.

6. An optical-fiber feedthrough which has i) an optical fiber formed of a resin-covered portion at which the surface of an optical-fiber bare fiber is covered and an optical-fiber bare fiber uncovered portion standing uncovered from the resin-covered portion and provided on the outer surface thereof with a metallic film and ii) a metallic sleeve with which the optical fiber is fastened, and which is to be attached to the package sidewall of an optical communication module so that the optical fiber is guided into the optical communication module, wherein said metallic sleeve comprises:

a sleeve main body having a first hollow portion which has an inner diameter greater than an outer diameter of the optical-fiber bare fiber uncovered portion in the optical fiber and into which the optical-fiber bare fiber uncovered portion is inserted, and a second hollow portion which communicates with this first hollow portion and which has an inner diameter greater than an outer diameter of the resin-covered portion in the optical fiber and in which an inserted portion of the resin-covered portion and an optical-fiber bare fiber uncovered portion standing uncovered from the resin-covered portion to lead to the first hollow portion are held; and a first conical recessed portion which is provided on the first hollow portion side of the sleeve main body and to which the leading end portion of the optical-fiber bare fiber uncovered portion is uncovered, the interior of said first conical recessed portion being filled with a solder to fasten the optical-fiber bare fiber uncovered portion to the metallic sleeve and also to close a gap between the first hollow portion and the optical-fiber bare fiber uncovered portion with the solder, and a gap between the second hollow portion and the resin-covered portion being filled with an adhesive to fasten the resin-covered portion to the metallic sleeve, and wherein a terminal component part to be held inside the package of the optical communication module is set in said metallic sleeve on its first conical recessed portion side, where said terminal component part is formed of i) a terminal component part main body having a third hollow portion which has an inner diameter larger than the outer diameter of the optical-fiber bare fiber uncovered portion and into which the optical-fiber bare fiber uncovered portion extending outward from the first conical recessed portion is inserted, a fourth hollow portion which has an inner diameter greater than the outer diameter of the optical-fiber bare fiber uncovered portion and into which the optical-fiber bare fiber uncovered portion is inserted and a fifth hollow portion which communicates with said fourth hollow portion and which has an inner diameter greater than the fourth hollow portion and in which the optical-fiber bare fiber uncovered portion extending outward from the first conical recessed portion of the metallic sleeve is held, and ii) a second conical recessed portion which is provided in said terminal component part main body on its side opposite to the metallic sleeve and to which the leading end portion of the optical-fiber bare fiber uncovered portion is uncovered, and also the interior of this second conical recessed portion is filled with a solder to fasten the optical-fiber bare fiber uncovered portion to the terminal component part and to close a gap between the fourth hollow portion and the optical-fiber bare fiber uncovered portion with the solder.

7. The optical-fiber feedthrough according to claim 6, wherein an auxiliary cylindrical portion is provided which extends outward from the peripheral edge portion of the second conical recessed portion in said terminal component part main body, and which also has a sixth hollow portion which communicates with said fourth hollow portion and which has an inner diameter greater than said fourth hollow portion, to protect the leading end of the optical-fiber bare fiber uncovered portion standing uncovered from the second conical recessed portion, and wherein the leading end portion of said optical-fiber bare fiber uncovered portion has been subjected to end face treatment for optical coupling.

8. The optical-fiber feedthrough according to any one of claims 4 to 7, wherein said terminal component part is provided on the surface thereof with a subbing layer formed of an Ni and/or Cr plating layer and a surface layer formed of an Au plating layer.

9. The optical-fiber feedthrough according to claim 5 or 7, wherein a cutout is provided at the sixth hollow portion of said auxiliary cylindrical portion.

* * * * *